Nov. 10, 1970  P. W. OSBORNE  3,538,757
STEADY STATE FRACTURE DEVICE
Filed Aug. 23, 1968
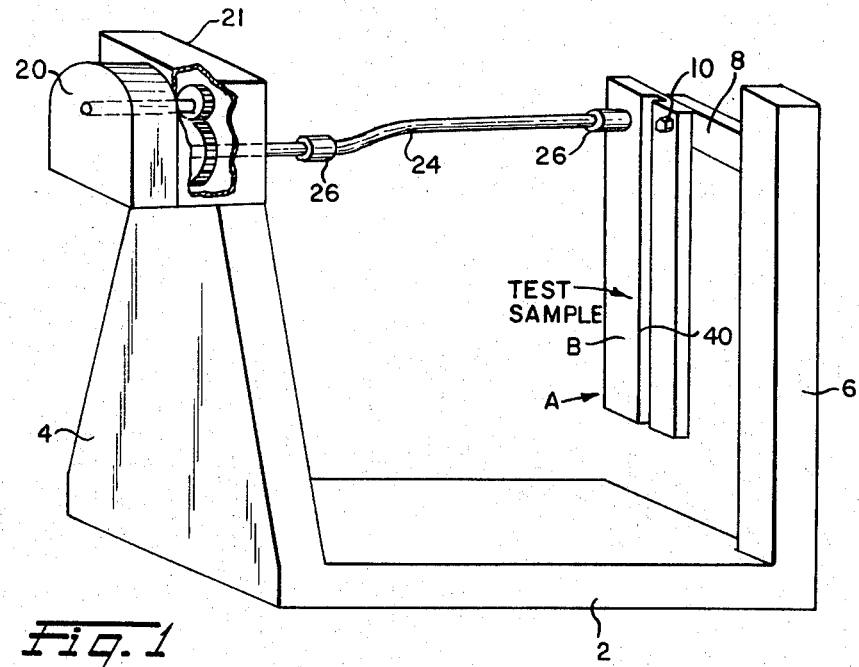
Fig. 1
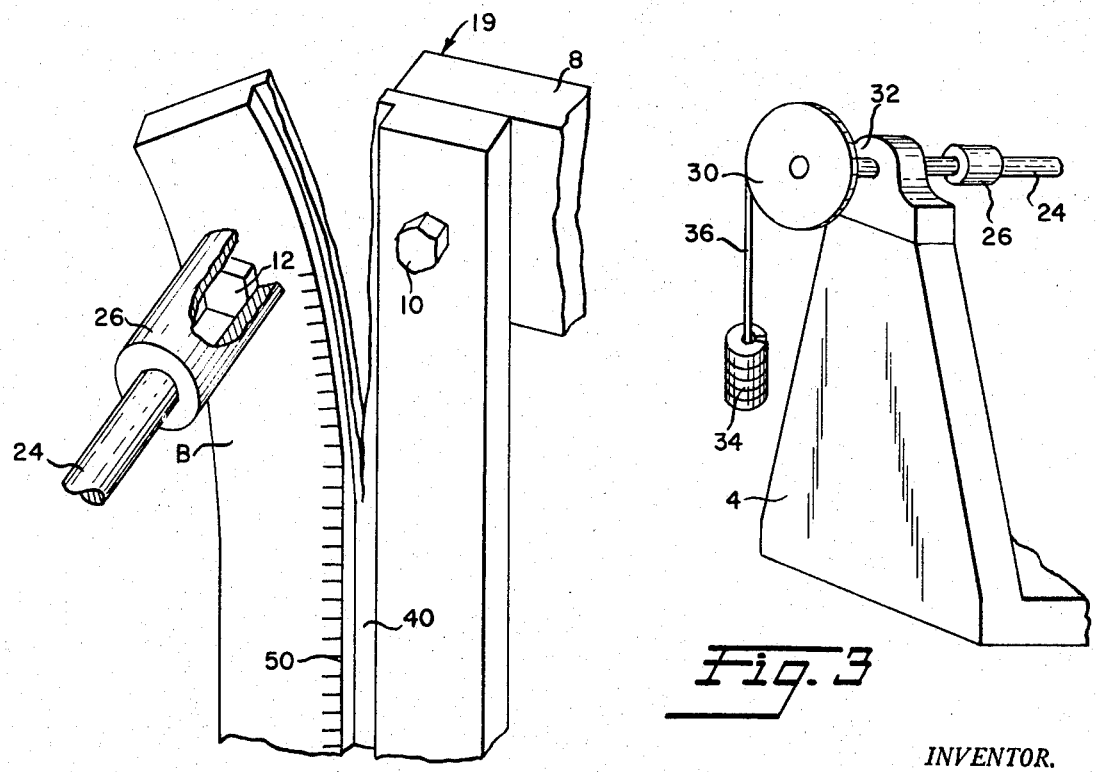
Fig. 2
Fig. 3
INVENTOR.
PHILLIP W. OSBORNE
BY
Scrivener Parker Scrivener + Clarke
ATTORNEYS

3,538,757
STEADY STATE FRACTURE DEVICE
Phillip W. Osborne, Mayaguez, Puerto Rico, assignor to Commonwealth of Puerto Rico
Filed Aug. 23, 1968, Ser. No. 754,826
Int. Cl. G01n 3/22
U.S. Cl. 73—100                                 1 Claim

ABSTRACT OF THE DISCLOSURE

Apparatus for determining directly the variable factors, such as load, velocity of crack propagation, effect of temperature, and the like, involved in the propagation of a crack in a material. A test frame is provided to support a specimen of the material in such a way that part of the specimen can be torn by crack propagation from the supported part. The part to be separated is connected by a shaft to a motor, static load or the like which applies a torque tending to separate the parts of the specimen, and the crack propagating force is measured by strain gauges or the like in the torque-transmitting shaft.

DESCRIPTION OF THE DRAWINGS

FIG. 1 is a perspective view of the test apparatus provided by the invention, showing a test specimen mounted thereon;

FIG. 2 is an enlarged partial view of parts of the test apparatus and specimen shown in FIG. 1, and FIG. 3 is a perspective view of part of the test apparatus, showing an alternative torque applying means.

DESCRIPTION OF THE INVENTION

The present invention relates to methods and apparatus for testing materials and, in particular, to the measurement of the load required to propagate a crack in a material. Crack propagation is an important characteristic of many materials, as failure by crack propagation can lead to expensive breakdowns of machines and equipment and also endanger human life. Various types of testing apparatus and techniques have been used to evaluate crack propagation in materials but these do not directly indicate the load required to produce and propagate a crack in a material, but, as with tensile tests, they normally yield results from which the load to propagate a crack in a material can be statistically determined.

The principal object of the invention has therefore been to provide an apparatus for directly measuring the load required to propagate a crack in a material and, more specifically, to provide an apparatus for measuring the land required to propagate a crack as the crack proceeds through a material, or measuring the velocity of a crack as it is propagated through a material at constant load, or measuring the change in load required to propagate a crack through a material as a function of changes of temperature, crack velocity, or other environmental factor.

The test apparatus provided by the invention comprises a supporting frame having a base 2 having spaced, parallel upright parts 4, 6 at the opposite ends thereof, forming a generally U-shaped structure, the height of the upright part 6 being sufficient to support a test specimen A above the upper surface of the base 2. Adjacent its upper end the upright part 6 has rigidly attached thereto a laterally extending arm 8 which is provided adjacent its outer free end with one or more holes which are adapted to receive one or more bolts 10 by which the test specimen may be rigidly connected to the arm 8. It will be understood that the test specimen is mounted on arm 8 in such a way that a part B of the specimen lies outside the means connecting the specimen to the arm, whereby such outlying part may be torn from the part connected to the arm by crack propagation. In order to facilitate the application of crack-producing torque to the outlying part B, that part is provided with a bolt or other device having a polygonal head 12 which is used in a manner described hereinafter.

Means are provided by the invention for applying torque to the outlying part B of a test specimen supported by bolt 10 on arm 8 of the test apparatus, and such means comprise first a torque-producing means supported at or adjacent the upper part of the upright member 4 of the test apparatus. In the embodiment of the invention shown in FIG. 1 the torque producing means comprises electric motor 20 the armature of which is connected through reduction gearing 22 to a rigid rod or flexible cable 24 which includes a strain gauge 26 and the remote end of which, adjacent the arm 8 of upright member 4, is provided with a socket 26 which is constructed to receive the polygonal nut 12 on the outlying part B of the test specimen.

In an alternative form which the invention may take a static load is applied to the shaft 24 which transmits crack-propagating torque to the outlying part of the test specimen. Such means are shown in FIG. 3 of the drawings and comrpise a pulley 30 which is rigidly connected to the end of shaft outside the bearing 32 which supports the shaft on end member 4 of the frame. A weight 34 is connected by flexible strand 36 to the periphery of the pulley and constantly tends to rotate the pulley to apply torque to the shaft. As indicated, the weight 34 may be adjusted to permit observation of the effect of changes in temperature and other variable factors on the rate and other phenomena of crack propagation in the test specimen. The strain gauge 26 may or may not be included in this embodiment of the invention.

In testing a material for crack propagation qualities a specimen of the material is mounted on arm 8 of the test frame by means of bolt 10 as shown in FIG. 1, and if the applied torque is to be high two or more bolts may be used to attach the specimen. Torque is applied to the specimen by the motor and associated means of FIG. 1 or the static load means of FIG. 3 and is exerted through shaft 24, socket 26 and nut 12. Improved results are obtained if a groove 40 is made in the specimen between the fixed part and the part to be separated therefrom, extending in the direction of intended crack propagation, and a cut is made in the specimen along the groove before the test is started. The cut should be made from the top of the specimen and should extend down about an inch past the level at which the specimen is attached to the bracket.

The shaft 24 may be a cable or a rigid bar and may have universal joints (not shown) at each end. The input torque to the shaft may be measured by the strain gauge 26. When measuring small torques the flexible shaft can be supported by a soft spring near the specimen to make the shaft "weightless" and increase the accuracy. The scribe marks 50 on the specimen, which are shown in FIG. 2, permit the crack velocity to be measured. The embodiment of FIG. 1 is suitable for submerging the specimen in a liquid bath.

The essential advantage of this apparatus over those previously used to investigate crack propagation is that it is based on the principle that a torque acts equally anywhere in its plane of application, by reason of which the crack propagates stably. Expressed otherwise, as the crack tip advances, there is no tendency of the velocity of the crack to increase unless, of course, the motivating torque is increased. A crack can be propagated slowly, stopped, and restarted, and the ability to control the crack propagation offers advantages obvious to anyone familiar with the field of fracture.

I claim:

1. Apparatus for testing a specimen to determine the crack propagation qualities thereof, comprising two spaced, fixed members, the first of said members having means for supporting a test specimen in a plane in fixed relation to the member with part of the test specimen outside the point of support, the other of said members having means for producting a torque, a shaft extending from the torque producing means toward the first member in alignment with the part of the test specimen outside its point of support to the first member and perpendicular to the plane in which said specimen is supported, and means for attaching the shaft to said part of the test specimen, whereby operation of the torque producing means will tend to separate the part of the test specimen outside the supported part from the supported part, and means for measuring the torque transmitted from the torque producing means through the shaft to the test specimen.

References Cited

UNITED STATES PATENTS

| | | | |
|---|---|---|---|
| 1,559,466 | 10/1925 | Schopper | 73—100 |
| 2,765,655 | 10/1956 | Scott | 73—99 X |
| 3,225,592 | 12/1965 | Greene | 73—136 |

JERRY W. MYRACLE, Primary Examiner

U.S. Cl. X.R

73—96